US011112180B2

(12) United States Patent
Vouche et al.

(10) Patent No.: US 11,112,180 B2
(45) Date of Patent: Sep. 7, 2021

(54) MODULAR AIR COOLED CONDENSER APPARATUS AND METHOD

(71) Applicant: SPG DRY COOLING USA LLC, Overland Park, KS (US)

(72) Inventors: Michel Vouche, Marbais (BE); Christophe Deleplanque, Brussels (BE); Fabien Fauconnier, Le Roeulx (BE)

(73) Assignee: SPG Dry Cooling USA LLC, Overland Park, KS (US)

( * ) Notice: Subject to any disclaimer, the term of this patent is extended or adjusted under 35 U.S.C. 154(b) by 0 days.

(21) Appl. No.: 16/729,830

(22) Filed: Dec. 30, 2019

(65) Prior Publication Data
US 2020/0132376 A1 Apr. 30, 2020

Related U.S. Application Data

(63) Continuation of application No. 16/515,363, filed on Jul. 18, 2019, now Pat. No. 10,527,354, which is a
(Continued)

(51) Int. Cl.
*B01D 5/00* (2006.01)
*F28B 1/06* (2006.01)
(Continued)

(52) U.S. Cl.
CPC ............... *F28B 1/06* (2013.01); *B23P 15/26* (2013.01); *F28B 7/00* (2013.01); *F28B 9/02* (2013.01); *Y10T 29/4935* (2015.01)

(58) Field of Classification Search
CPC ...... F28B 1/06; F28B 9/02; F28B 7/00; F28B 9/00; F28C 1/14; B23P 15/26;
(Continued)

(56) References Cited

U.S. PATENT DOCUMENTS 2,401,918 A 6/1946 Elder et al.
3,073,575 A 1/1963 Schulenberg
(Continued)

FOREIGN PATENT DOCUMENTS

CA 2444475 10/2002
CN 1185205 6/1998
(Continued)

OTHER PUBLICATIONS

United States Patent and Trademark Office, "Restriction Requirement," issued in connection with U.S. Appl. No. 13/478,827, dated Jan. 5, 2015, 7 pages.
(Continued)

*Primary Examiner* — Henry T Crenshaw
*Assistant Examiner* — Kamran Tavakoldavani
(74) *Attorney, Agent, or Firm* — Hanley, Flight & Zimmerman, LLC

(57) ABSTRACT

Modular air cooled condenser apparatus and related methods are disclosed. An example mechanical draft modular air cooled condenser includes a succession of a first condenser bundle panel, a second condenser bundle panel, a third condenser bundle panel, and a fourth condenser bundle panel. The example condenser also includes a first, second, third, and fourth condensate headers connected to respective ones of the first, second, third, and fourth condenser bundle panels. The example condenser also includes a fan positioned to create a draft to flow over the first, second, third, and fourth condenser bundle panels.

11 Claims, 5 Drawing Sheets

Related U.S. Application Data continuation of application No. 16/196,840, filed on Nov. 20, 2018, now Pat. No. 10,551,126, which is a continuation of application No. 14/812,513, filed on Jul. 29, 2015, now abandoned, which is a continuation of application No. 13/478,827, filed on May 23, 2012, now Pat. No. 9,551,532.

(51) Int. Cl.
  *B23P 15/26* (2006.01)
  *F28B 7/00* (2006.01)
  *F28B 9/02* (2006.01)

(58) Field of Classification Search
  CPC ......... Y10T 29/4935; F28F 1/00; F28F 9/007; F28F 9/013; F28F 2280/00; F28F 2280/02; F28F 2280/04; F28F 2280/06; F28F 2280/08; F28F 2280/10; F28F 2280/105; F28D 1/05308; F28D 5/00; B21D 53/02

See application file for complete search history.

(56) References Cited

U.S. PATENT DOCUMENTS

| | | | |
|---|---|---|---|
| 3,204,693 | A | 9/1965 | Kuhn |
| 3,384,165 | A | 5/1968 | Mathews |
| 3,519,068 | A | 7/1970 | Harris et al. |
| 3,612,172 | A | 10/1971 | Dohnt |
| 3,630,273 | A | 12/1971 | La Haye |
| 3,685,579 | A | 8/1972 | Spangemacher |
| 3,707,185 | A | 12/1972 | Modine et al. |
| 3,976,127 | A | 8/1976 | Harris |
| 4,076,771 | A | 2/1978 | Houx, Jr. et al. |
| 4,168,742 | A | 9/1979 | Kluppel et al. |
| 4,367,183 | A | 1/1983 | Carbonaro |
| 4,470,271 | A | 9/1984 | Draper et al. |
| 4,513,813 | A * | 4/1985 | Zanobini ............. F28B 1/06 165/110 |
| 4,913,710 | A | 4/1990 | Reverdv |
| 4,926,931 | A | 5/1990 | Larinoff |
| 4,949,543 | A | 8/1990 | Cottone et al. |
| 5,007,501 | A | 4/1991 | Baston |
| 5,098,006 | A | 3/1992 | McManus |
| 5,121,613 | A | 6/1992 | Cox et al. |
| 5,139,083 | A | 8/1992 | Larinoff |
| 5,301,746 | A | 4/1994 | Trage et al. |
| 5,765,629 | A | 6/1998 | Goldsmith et al. |
| 5,851,446 | A | 12/1998 | Bardo et al. |
| 5,902,522 | A | 5/1999 | Seawell et al. |
| 5,966,809 | A | 10/1999 | Pierce |
| 6,378,605 | B1 | 4/2002 | Kutscher et al. |
| 6,474,272 | B2 | 11/2002 | Bensing et al. |
| 7,610,949 | B2 | 11/2009 | Palanchon |
| 7,926,555 | B2 | 4/2011 | Sanderlin et al. |
| 8,166,776 | B2 | 5/2012 | Kopko et al. |
| 8,297,344 | B2 | 10/2012 | Vouche |
| 9,551,532 | B2 | 1/2017 | Vouche et al. |
| 9,951,994 | B2 | 4/2018 | Vouche et al. |
| 2002/0005176 | A1 | 1/2002 | Bensing et al. |
| 2005/0091993 | A1 | 5/2005 | Paradis |
| 2005/0167093 | A1 | 8/2005 | Schaefer |
| 2008/0160902 | A1 | 7/2008 | Desler |
| 2009/0165993 | A1 | 7/2009 | Yang et al. |
| 2009/0178279 | A1 | 7/2009 | Schabosky et al. |
| 2009/0211743 | A1 | 8/2009 | Schrader et al. |
| 2009/0220334 | A1* | 9/2009 | Vouche ............. F04D 29/664 415/119 |
| 2010/0044010 | A1 | 2/2010 | Corser et al. |
| 2010/0078147 | A1 | 4/2010 | Samyn et al. |
| 2010/0132917 | A1 | 6/2010 | Runk et al. |
| 2010/0147487 | A1 | 6/2010 | Lewandowski et al. |
| 2010/0263840 | A1* | 10/2010 | Nobel ............. F28F 1/126 165/120 |
| 2012/0023940 | A1 | 2/2012 | Kitz et al. |
| 2013/0120931 | A1 | 5/2013 | Sankar et al. |
| 2013/0312932 | A1 | 11/2013 | Vouche et al. |
| 2014/0150989 | A1 | 6/2014 | Eindhoven |
| 2014/0367243 | A1 | 12/2014 | Kroger et al. |
| 2015/0204611 | A1 | 7/2015 | Vouche et al. |
| 2015/0330709 | A1 | 11/2015 | Vouche et al. |
| 2017/0363358 | A1 | 12/2017 | Bugler, III et al. |
| 2019/0086151 | A1 | 3/2019 | Vouche et al. |
| 2019/0339010 | A1 | 11/2019 | Vouche et al. |

FOREIGN PATENT DOCUMENTS

| | | |
|---|---|---|
| CN | 101568790 | 10/2009 |
| CN | 101655322 | 2/2010 |
| EP | 0346848 | 12/1989 |
| GB | 464531 | 4/1937 |
| GB | 908429 | 10/1962 |
| GB | 908806 | 10/1962 |
| JP | S54126804 A | 9/1979 |
| KR | 100203196 B1 | 6/1999 |
| WO | 2010125017 | 11/2010 |

OTHER PUBLICATIONS

United States Patent and Trademark Office, "Non-Final Office Action," issued in connection with U.S. Appl. No. 13/478,827, dated Apr. 10, 2015, 23 pages.

United States Patent and Trademark Office, "Final Office Action," issued in connection with U.S. Appl. No. 13/478,827, dated Oct. 16, 2015, 17 pages.

United States Patent and Trademark Office, "Notice of Allowance," issued in connection with U.S. Appl. No. 13/478,827, dated Sep. 16, 2016, 18 pages.

United States Patent and Trademark Office, "Final Office Action," issued in connection with U.S. Appl. No. 14/504,570, dated Aug. 8, 2017, 25 pages.

United States Patent and Trademark Office, "Non-Final Office Action," issued in connection with U.S. Appl. No. 14/504,570, dated Jan. 12, 2017, 38 pages.

United States Patent and Trademark Office, "Notice of Allowance," issued in connection with U.S. Appl. No. 14/504,570, dated Jan. 4, 2018, 12 pages.

United States Patent and Trademark Office, "Non-Final Office Action," issued in connection with U.S. Appl. No. 14/812,513, dated Feb. 6, 2018, 33 pages.

United States Patent and Trademark Office, "Final Office Action," issued in connection with U.S. Appl. No. 14/812,513, dated Aug. 2, 2018, 27 pages.

United States Patent and Trademark Office, "Restriction Requirement," issued in connection with U.S. Appl. No. 14/812,513, dated Apr. 18, 2017, 6 pages.

United States Patent and Trademark Office, "Final office action," issued in connection with U.S. Appl. No. 16/196,840, dated Jun. 20, 2019, 36 pages.

United States Patent and Trademark Office, "Non-Final office action," issued in connection with U.S. Appl. No. 16/196,840, dated Dec. 26, 2018, 33 pages.

"Third Party Submission of Prior art" filed Apr. 9, 2019, in U.S. Appl. No. 16/196,840, 75 pages.

United States Patent and Trademark Office, "Non-Final Office action," issued in connection with U.S. Appl. No. 14/812,513, dated Dec. 5, 2018, 45 pages.

Chinese Patent Office, "First Office action," issued in connection with Chinese patent application No. 2013101959209, dated Nov. 23, 2015, 11 pages.

International Searching Authority, "Search Report and Written Opinion," issued in connection with PCT patent application No. PCT/US2014/039718, dated Oct. 7, 2014, 9 pages.

International Searching Authority, "International Preliminary Report on Patentability," issued in connection with PCT patent application No. PCT/US2014/039718, dated Dec. 1, 2015, 8 pages.

(56) References Cited

OTHER PUBLICATIONS

United States Patent and Trademark Office, "Advisory Action," issued in connection with U.S. Appl. No. 16/196,840, dated Jul. 30, 2019, 7 pages.
United States Patent and Trademark Office, "Non-Final Office action," issued in connection with U.S. Appl. No. 16/196,840, dated Sep. 30, 2019, 45 pages.
United States Patent and Trademark Office, "Notice of Allowance," issued in connection with U.S. Appl. No. 16/515,363, dated Nov. 29, 2019, 30 pages.
United States Patent and Trademark Office, "Non-Final Office action," issued in connection with U.S. Appl. No. 16/515,363, dated Oct. 10, 2019, 65 pages.
United States Patent and Trademark Office, "Notice of Allowance," issued in connection with U.S. Appl. No. 16/196,840, dated Nov. 29, 2019, 30 pages.
United States Patent and Trademark Office, "Corrected Notice of Allowability," issued in connection with U.S. Appl. No. 16/196,840, dated Dec. 12, 2019, 6 pages.
Exhibit 1002 Part 1 of 3 to IPR 2021-00687: "Excerpts from the Prosecution History of the '126 patent," 181 pages.
Exhibit 1002 Part 2 of 3 to IPR 2021-00687: "Excerpts from the Prosecution History of the '126 patent," 182 pages.
Exhibit 1002 Part 3 of 3 to IPR 2021-00687: "Excerpts from the Prosecution History of the '126 patent," 181 pages.
Exhibit 1003 to IPR 2021-00687: "Declaration of Dr. Anthony Jacobi," 195 pages.
Exhibit 1004 to IPR 2021-00687 and Exhibit 1004 to IPR 2021-00688: "U.S. Pat. No. 3,073,575 to Schulenberg," 12 pages.
Exhibit 1001 to IPR 2021-00687: "U.S. Pat. No. 10,551,126 to Vouche et al.," 13 pages.
Exhibit 1005 to IPR 2021-00687 and Exhibit 1005 to IPR 2021-00688: "Air Cooled Condenser Design, Specification, and Operation—Electric Power Research Institute," Dec. 2005, 159 pages.
Exhibit 1006 Part 1 to IPR 2021-00687 and Exhibit 1006 Part 1 to to IPR 2021-00688: "Detlev G. Kroger, Air-Cooled Heat Exchangers and Cooling Towers," vol. 1 Part 1, 2004, 279 pages.
Exhibit 1006 Part 2 to IPR 2021-00687 and Exhibit 1006 Part 2 to IPR 2021-00688: "Detlev G. Kroger, Air-Cooled Heat Exchangers and Cooling Towers," vol. 1 Part 2, 2004, 280 pages.
Exhibit 1007 to IPR 2021-00687 and Exhibit 1007 to IPR 2021-00688: "Standard 40-foot Container Dimensions, available at https://www.searates.com/reference/equipment/2" 2020, 1 page.
Exhibit 1008 to IPR 2021-00687 and Exhibit 1008 to IPR 2021-00688: "U.S. Pat. No. 3,707,185 to Modine et al.," Dec. 26, 1972, 5 pages.
Exhibit 1009 to IPR 2021-00687 and Exhibit 1009 to IPR 2021-00688: "Canadian Patent 2,444,475 to O'Kane et al.," Oct. 24, 2002, 23 pages.
Exhibit 1010 to IPR 2021-00687 and Exhibit 1010 to IPR 2021-00688: "US Published Application 2009/0178279 to Schabosky," Jul. 16, 2009, 7 pages.
Exhibit 1011 to IPR 2021-00687 and Exhibit 1011 to IPR 2021-00688: Aleks D. Atrens, Hal Gurgenci and Victor Rudolph, 'Economic Optimization of a CO2-Based EGS Power Plant,' Energy Fuels, 2011, 11 pages.
Exhibit 1012 to IPR 2021-00687 and Exhibit 1012 to IPR 2021-00688: "Haibo Zhai, Edward S. Rubin and Peter L. Versteeg, 'Water Use at Pulverized Coal Power Plants with Postcombustion Carbon Capture and Storage,' Environmental Science & Technology," Feb. 2011, 7 pages.
Exhibit 1013 to IPR 2021-00687 and Exhibit 1013 to to IPR 2021-00688: "Electric Power Research Institute, EPRI Journal, Spring 2006," 44 pages.
Exhibit 1014 to IPR 2021-00687: "Declaration of Jacob Munford," 31 pages.
Exhibit 1015 to IPR 2021-00687: "Declaration of Kyle Murphy," 180 pages.
Exhibit 1016 to IPR 2021-00687 and Exhibit 1016 to IPR 2021-00688: "U.S. Patent Application Pub. No. 2005/0091993 to Paradis," 18 pages.
Exhibit 1017 to IPR 2021-00687 and Exhibit 1017 to IPR 2021-00688: "U.S. Patent Application Pub. No. 2013/0120931 to Sankar et al.," 14 pages.
Exhibit 1020 to IPR 2021-00687 and Exhibit 1020 to IPR 2021-00688: "*SPG Dry Cooling USA LLC* v. *Evapco Dry Cooling, Inc.*, Case No. 20-20131 (D.N.J.)," Dec. 22, 2020, 22 pages.
Petition for Inter Partes Review of U.S. Pat. No. 10,551,126 (IPR 2021-00687), 135 pages.
Exhibit 1001 to IPR 2021-00688: "U.S. Pat. No. 10,527,354 to Vouche et al.," Jan. 7, 2020, 12 pages.
Exhibit 1002 Part 1 of 3 to IPR 2021-00688: "Excerpts from the Prosecution History of the '354 patent," 121 pages.
Exhibit 1002 Part 2 of 3 to IPR 2021-00688: "Excerpts from the Prosecution History of the '354 patent," 116 pages.
Exhibit 1002 Part 3 of 3 to IPR 2021-00688: "Excerpts from the Prosecution History of the '354 patent," 109 pages.
Exhibit 1003 to IPR 2021-00688: "Declaration of Dr. Anthony Jacobi," 191 pages.
Exhibit 1014 to IPR 2021-00688: "Declaration of Jacob Munford," 31 pages.
Exhibit 1015 to IPR 2021-00688: "Declaration of Kyle Murphy," 180 pages.
Petition for Inter Partes Review of U.S. Pat. No. 10,527,354 (IPR 2021-00688),138 pages.
Exhibit 1001 to IPR 2021-00809: "U.S. Pat. No. 9,551,532 to Vouche et al.," Jan. 24, 2017, 12 pages.
Exhibit 1002 to IPR 2021-00809: "Excerpts from the Prosecution History of the '532 Patent," 297 pages.
Exhibit 1003 to IPR 2021-00809: "Declaration of Dr. Anthony Jacobi," 162 pages.
Exhibit 1004 to IPR 2021-00809: "U.S. Pat. No. 3,073,575 F. Schulenberg," Jan. 15, 1963, 12 pages.
Exhibit 1005 to IPR 2021-00809: "U.S. Pat. No. 2,401,918 F.T. Elder et al." Jun. 11, 1946, 4 pages.
Exhibit 1006 to IPR 2021-00809: "US Published Application 2005-0167093 Schaefer," Aug. 4, 2005, 7 pages.
Exhibit 1007 to IPR 2021-00809: "US Published Application 2010-0263840 Nobel," Oct. 21, 2010, 6 pages.
Exhibit 1008 to IPR 2021-00809: "U.S. Pat. No. 3,707,185 Modine et al.," Dec. 26, 1972, 5 pages.
Exhibit 1009 to IPR 2021-00809: "Canadian Patent 2,444,475 O'kane et al.", Feb. 16, 2010, 23 pages.
Exhibit 1010 to IPR 2021-00809: US Published Application 2009-0178279 Schabosky et al., Jul. 17, 2009, 7 pages.
Exhibit 1011 to IPR 2021-00809: Container—"Parameters of sea container" 1 page.
Exhibit 1013 Part 1 of 2 to IPR 2021-0809: "Air-cooled Heat Exchangers and Cooling Towers vol. 1," Kroger, 279 pages.
Exhibit 1013 Part 2 of 2 to IPR 2021-00809: "Air-cooled Heat Exchangers and Cooling Towers vol. 1," Kroger, 280 pages.
Exhibit 1014 to IPR 2021-00809: "U.S. Pat. No. 4,513,813 Zanobini," Apr. 30, 1985 7 pages.
Exhibit 1015 to IPR 2021-00809: "Dictionary definition of manifold, Collins Dictionary, 10th Ed." 3 pages.
Exhibit 1016 to IPR 2021-00809: "Dictionary definition of manifold, New Oxford Dictionary, 3rd Ed." 3 pages.
Exhibit 1019 to IPR 2021-00809: "Declaration of Jacob Munford",15 pages.
Exhibit 1020 to IPR 2021-00809: "Complaint, *SPG Dry Cooling USA LLC* v. *Evapco Dry Cooling, Inc.*, Case No. 20-20131 (D.N. J.)" 22 pages.
Petition for Inter Partes Review (IPR 2021-00809), 112 pages.

\* cited by examiner

MODULAR AIR COOLED CONDENSER APPARATUS AND METHOD

CROSS-REFERENCE TO RELATED APPLICATIONS

This patent arises as a continuation of U.S. patent application Ser. No. 16/515,363, entitled MODULAR AIR COOLED CONDENSER APPARATUS AND METHOD, filed Jul. 18, 2019, which is a continuation of U.S. patent application Ser. No. 16/196,840, entitled MODULAR AIR COOLED CONDENSER APPARATUS AND METHOD, filed Nov. 20, 2018, which is a continuation of U.S. patent application Ser. No. 14/812,513, entitled MODULAR AIR COOLED CONDENSER APPARATUS AND METHOD, filed Jul. 29, 2015, which is a continuation of U.S. patent application Ser. No. 13/478,827, entitled MODULAR AIR COOLED CONDENSER APPARATUS AND METHOD, filed May 23, 2012, now U.S. Pat. No. 9,551,532. This application claims priority to U.S. patent application Ser. No. 16/515,363, U.S. patent application Ser. No. 16/196,840, U.S. patent application Ser. No. 14/812,513, and U.S. patent application Ser. No. 13/478,827. U.S. patent application Ser. No. 16/515,363, U.S. patent application Ser. No. 16/196,840, U.S. patent application Ser. No. 14/812,513, and U.S. patent application Ser. No. 13/478,827 are hereby incorporated by reference in their entireties.

FIELD OF THE INVENTION

The present invention relates to a mechanical draft cooling tower that utilizes air cooled condenser modules. The aforementioned cooling tower operates by mechanical draft and achieves the exchange of heat between two fluids such as atmospheric air, ordinarily, and another fluid which is usually steam or some sort of industrial process fluid. The aforementioned cooling tower operates by mechanical draft which utilizes an air current generator such as a fan or the like.

BACKGROUND OF THE INVENTION

Cooling towers are heat exchangers of a type widely used to emanate low grade heat to the atmosphere and are typically utilized in electricity generation, air conditioning installations and the like. In a mechanical draft cooling tower for the aforementioned applications, airflow is induced or forced via an air flow generator such as a driven impeller, driven fan or the like. Cooling towers may be wet or dry. Dry cooling towers can be either "direct dry," in which steam is directly condensed by air passing over a heat exchange medium containing the steam or an "indirect dry" type cooling towers, in which the steam first passes through a surface condenser cooled by a fluid and this warmed fluid is sent to a cooling tower heat exchanger where the fluid remains isolated from the air, similar to an automobile radiator. Dry cooling has the advantage of no evaporative water losses. Both types of dry cooling towers dissipate heat by conduction and convection and both types are presently in use. Wet cooling towers provide direct air contact to a fluid being cooled. Wet cooling towers benefit from the latent heat of vaporization which provides for very efficient heat transfer but at the expense of evaporating a small percentage of the circulating fluid.

To accomplish the required direct dry cooling the condenser typically requires a large surface area to dissipate the thermal energy in the gas or steam and oftentimes may present several challenges to the design engineer. It sometimes can be difficult to efficiently and effectively direct the steam to all the inner surface areas of the condenser because of non-uniformity in the delivery of the steam due to system ducting pressure losses and velocity distribution. Therefore, uniform steam distribution is desirable in air cooled condensers and is critical for optimum performance. Another challenge or drawback is, while it is desirable to provide a large surface area, steam side pressure drop may be generated thus increasing turbine back pressure and consequently reducing efficiency of the power plant. Therefore it is desirous to have a condenser with a strategic layout of ducting and condenser surfaces that allows for an even distribution of steam throughout the condenser, that reduces back pressure, while permitting a maximum of cooling airflow throughout and across the condenser surfaces.

Another drawback to the current air cooled condenser towers is that they are typically very labor intensive in their assembly at the job site. The assembly of such towers oftentimes requires a dedicated labor force, investing a large amount of hours. Accordingly, such assembly is labor intensive requiring a large amount of time and therefore can be costly. Accordingly, it is desirable and more efficient to assemble as much of the tower structure at the manufacturing plant or facility, prior to shipping it to the installation site.

It is well known in the art that improving cooling tower performance (i.e. the ability to extract an increased quantity of waste heat in a given surface) can lead to improved overall efficiency of a steam plant's conversion of heat to electric power and/or to increases in power output in particular conditions. Moreover, cost-effective methods of manufacture and assembly also improve the overall efficiency of cooling towers in terms of cost-effectiveness of manufacture and operation. Accordingly, it is desirable for cooling tower that are efficient in both in the heat exchange properties and assembly. The present invention addresses this desire.

Therefore it would desirous to have an economical, mechanical draft, modular cooling tower that is efficient not only in its heat exchange properties but also in its time required for assembly and cost for doing the same.

SUMMARY OF THE INVENTION

Embodiments of the present invention advantageously provides for a fluid, usually steam and method for a modular mechanical draft cooling tower for condensing said steam.

An embodiment of the invention includes a method for assembling a modular air cooled condenser extending along a vertical axis away from horizontal, comprising the steps of: assembling a first condenser bundle assembly having a first set of tubes having first and second ends, a steam manifold connected to the first ends of the tubes, and a condensate header connected to the second ends of the tubes; assembling a second condenser bundle having a second set of tubes having first and second ends, a steam manifold connected to the first ends of the tubes, and a condensate header connected to the second ends of the tubes; placing the first and second condenser bundle assemblies in to a container; transporting the container to a location upon which the modular air cooled condenser will be assembled; assembling a heat exchange delta by placing the first condenser bundle and the second condenser bundle; and positioning the heat exchange delta on a modular tower frame.

Another embodiment of the present invention includes a modular air cooled condenser extending along a vertical axis away from horizontal, comprising: means for assembling a first condenser bundle assembly having a first set of tubes having first and second ends, a steam manifold connected to the first ends of the tubes, and a condensate header connected to the second ends of the tubes; means for assembling a second condenser bundle assembly having a second set of tubes having first and second ends, a steam manifold connected to the first end of the tubes, and a condensate header connected to the second ends of the tubes; means for placing the first and second condenser bundle assemblies in to a container; means for transporting the container to a location upon which the modular air cooled condenser will be assembled; means for assembling a heat exchange delta by placing using the first condenser bundle and the second condenser bundle; and means for positioning the heat exchange delta on a modular tower frame.

Another embodiment of the present invention, A mechanical draft modular air cooled condenser that cools an industrial fluid is disclosed, comprising: a plenum with which at least one delta resides wherein said at least one delta comprises first condenser bundle having a first set of tubes having first and second ends, a steam manifold connected to the first ends of the tubes, and a condensate header connected to the second ends of the tubes; and a second condenser bundle having a second set of tubes having first and second ends, a steam manifold connected to the first ends of the tubes, and a condensate header connected to the second ends of the tubes; a support frame that supports said plenum; and a shroud that houses an air current generator.

In yet another embodiment of the present invention, a method for assembling a modular air cooled condenser extending along a vertical axis is disclosed, comprising: assembling a first condenser bundle having a first set of tubes having first and second ends and a condensate header connected to the second end of the tubes; assembling a second condenser bundle having a second set of tubes having first and second ends, and a condensate header connected to the second end of the tubes; placing the first and second condenser bundles in to a container; transporting the container to a location upon which the modular air cooled condenser will be assembled; assembling a heat exchange delta by placing using the first condenser bundle and the second condenser bundle; and positioning the heat exchange delta on a modular tower frame.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The above-mentioned and other features and advantages of this disclosure, and the manner of attaining them, will become more apparent and the disclosure itself will be better understood by reference to the following description of various embodiments of the disclosure taken in conjunction with the accompanying figures.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that other embodiments may be utilized, and that structural, logical, processing, and electrical changes may be made. It should be appreciated that any list of materials or arrangements of elements is for example purposes only and is by no means intended to be exhaustive. The progression of processing steps described is an example; however, the sequence of steps is not limited to that set forth herein and may be changed as is known in the art, with the exception of steps necessarily occurring in a certain order.

Figure 1:
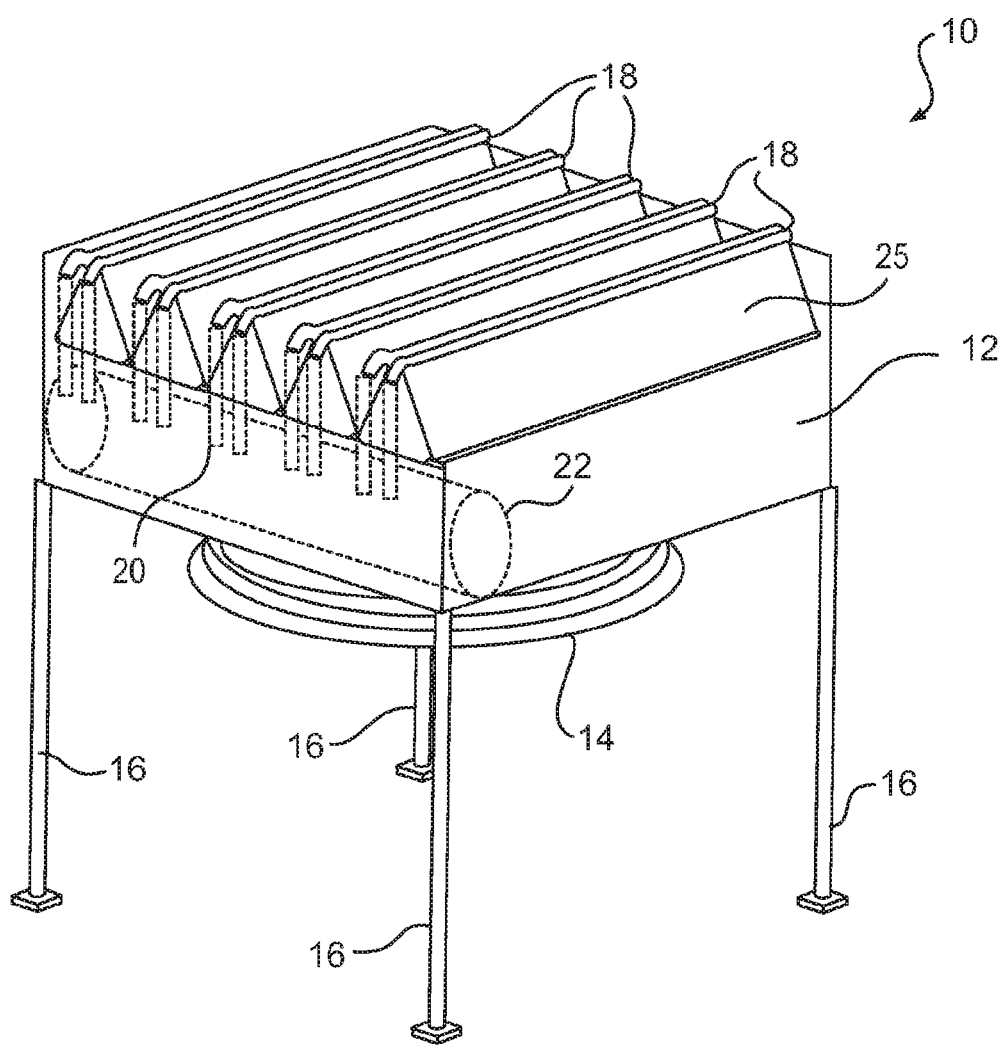
FIG. 1 is a perspective view of an air cooled condenser module in accordance with an embodiment of the present invention.

Turning now to FIG. 1, a modular air cooled condenser module, generally designated 10, is illustrated. The air cooled condenser module 10 generally includes a plenum 12, having an air current generator or fan disposed within a fan shroud or inlet bell 14 and a plurality of support columns or legs 16. The air cooled condenser module 10 further includes multiple A-type geometry deltas, each designated 18. Each delta 18 comprises two tube bundle assemblies 28 with a series of finned tubes to conduct heat transfer. The deltas 18 will be discussed in further detail below.

Figure 2:
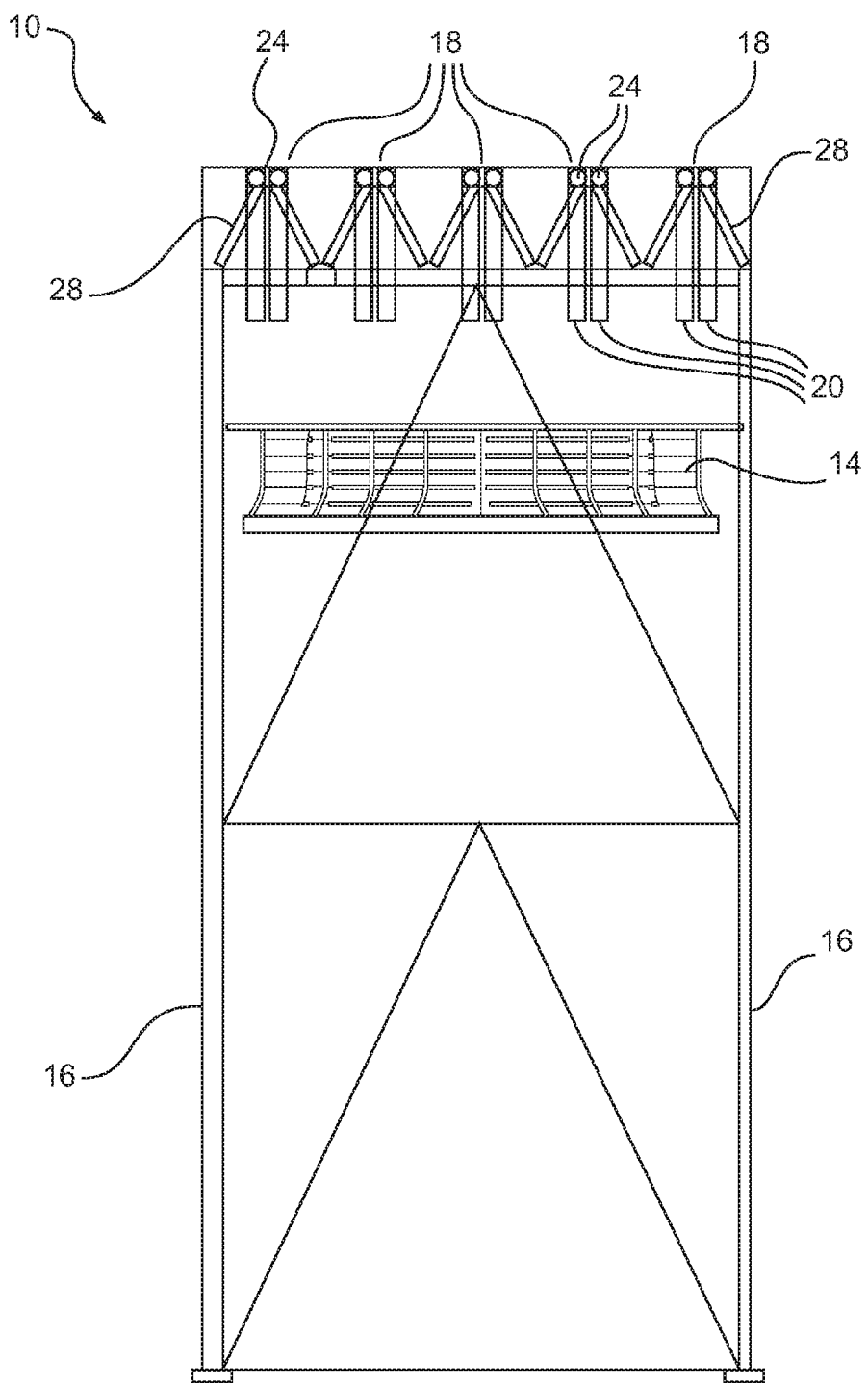
FIG. 2 is a schematic side view of the air cooled condenser module depicted in FIG. 1 in accordance with an embodiment of the present invention.
Figure 3:
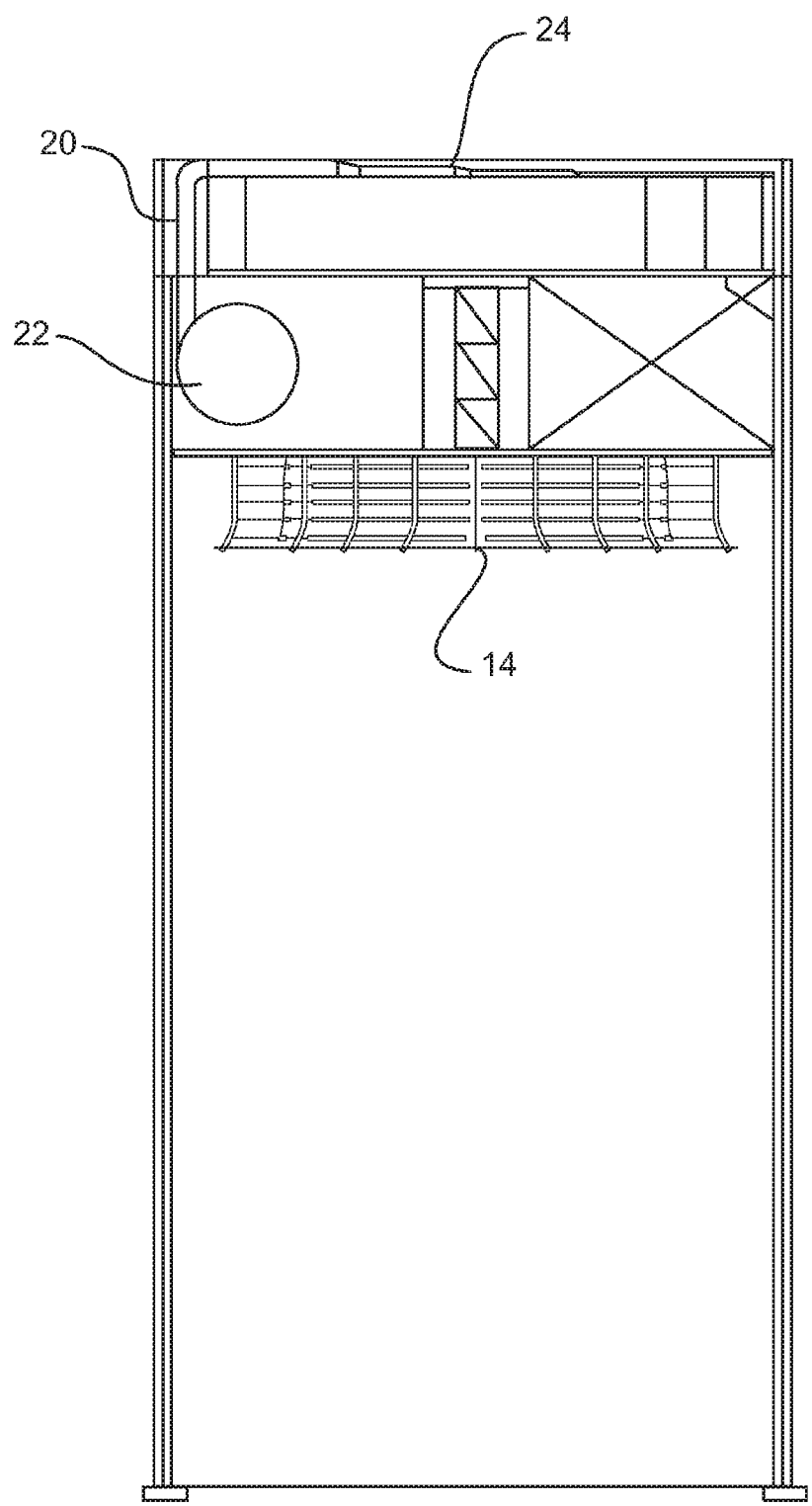
FIG. 3 is another schematic side view of the air cooled condenser module depicted in FIG. 1 in accordance with an embodiment of the present invention.

Turning now to FIGS. 2 and 3, schematic side views of the air cooled condenser 10 are depicted. As specifically illustrated in FIG. 2, the air cooled condenser employs risers 20 which are welded to the main steam duct 22. The risers 20 are connected to a steam manifold 24 which operates to keep the steam flow velocity more constant. This above described configuration is part the A-type condenser bundles 28 that are shipped as a unit from the factory, which will be discussed in further detail below. The condenser bundles 28 are preferably welded to the risers 20 via a transition piece 26 to accommodate the geometry of the steam manifold.

Figure 4:
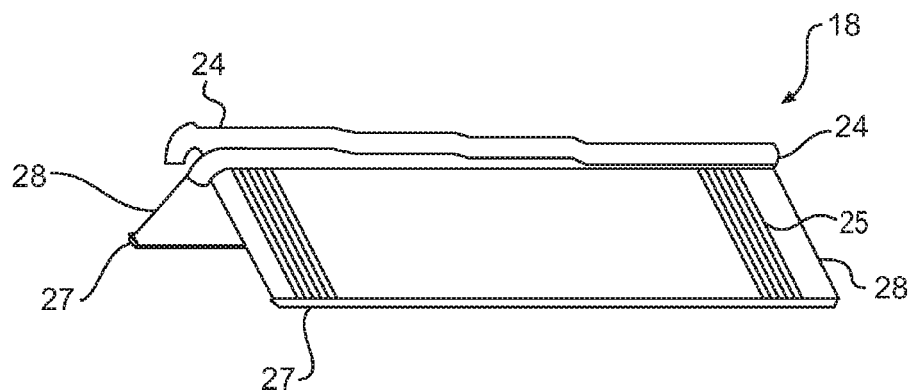
FIG. 4 is a perspective view of an A-type condenser configuration in accordance with an embodiment of the present invention.

Turning now to FIG. 4, a delta 18 is illustrated. As depicted, each delta 18 is comprised of two individual heat exchange bundle assemblies 28, each having a series of finned tubes. The individual tubes are approximately two (2) meters in length whereas the bundle length is approximately twelve (12) meters. As illustrated, each bundle assembly 28 is positioned at an angle to one another to form the A-type configuration of the delta 18. While the bundle assemblies 28 may be positioned at any desired angle, they preferably are positioned at an angle approximately twenty degrees (20°) to approximately thirty degrees (30°) from vertical and approximately sixty degrees (60°) to approximately seventy degrees (70°) from horizontal. More specifically, the bundle assemblies 28 are positioned at twenty-six degrees (26°) from vertical and sixty-four degrees (64°) from horizontal.

Each of the bundle assemblies 28 are assembled prior to shipping wherein each comprises a riser to header transition piece 26, steam manifold 24, finned tubes 25, and steam condensate headers 27. As can be seen in FIG. 1, due to the modular design and orientation of the bundle assemblies 28, the air cooled condenser design 10 has approximately five (5) times more tubes as compared to typical designs. Moreover, the embodiments of the current invention not only utilize five (5) times the tubes, but employ condenser tubes that are much shorter in length. As result of the aforementioned design and orientation, the steam velocity traveling through the tube bundles 28 is reduced as result of the increased number of tubes in combination with the reduced tube length, and therefore steam pressure drop within the deltas 18 is reduced, making the air cool condenser 10 more efficient.

Typically, turbine back pressure of an air cooled condenser or the like is limited by the maximum steam velocity in the tubes (to limit erosion) wherein the steam velocity is increasing with a decrease of back pressure (due to density of steam). Thus, due to the addition of tubes in accordance with the present invention, the steam is still maintained at the maximum allowable steam velocity but at a lower back pressure. The other limitation the current delta design addresses is that the pressure at the exit of the secondary bundles cannot be less than the vacuum group capability. This pressure typically results from turbine back pressure minus the pressure drop in ducting minus the pressure drop in the tubes. Accordingly, due to the reduced pressure drop in the tubes, the allowable turbine back pressure is lower with the delta 18 design.

Furthermore, the above-described bundle design also reduces the pressure drop within the individual delta 18. For example, the heat exchange that takes place via the deltas 18, is dependent upon the heat exchange coefficient, i.e., the mean temperature difference between air and steam and the exchange surface. Due to the reduced pressure drop as previously described, the mean pressure (average between inlet pressure and exit pressure) in the exchanger is higher with the design of the current condenser configuration 10. In other words, because steam is saturated, the mean steam temperature is also higher for the same heat exchange surface resulting in increased heat exchange.

Figure 5:
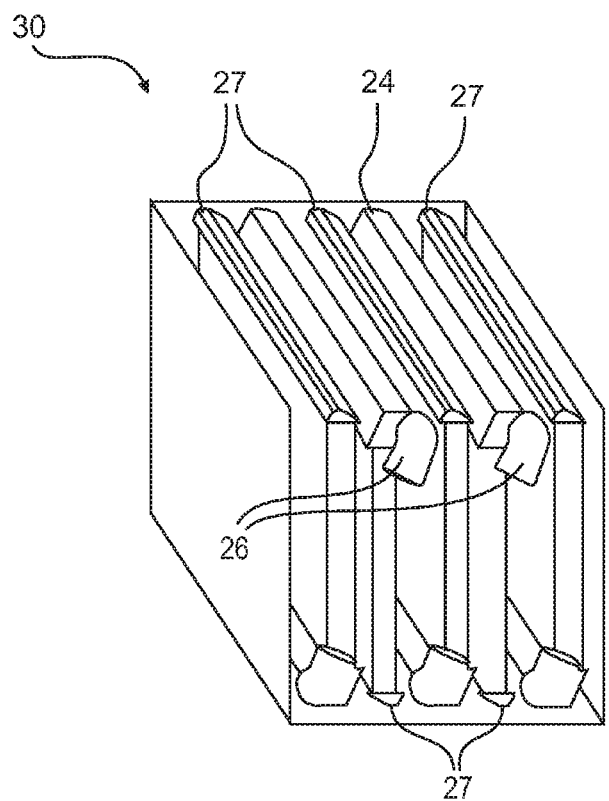
FIG. 5 illustrates the condenser bundles in a packaged arrangement for shipping in accordance with an embodiment of the present invention.

Turning now to FIG. 5, a transport container, generally designated 30 is illustrated. As the name suggests, the transport container 30 is used to transport the bundles 28, from the factory to the job site. As illustrated, the condenser bundles 28, are manufactured and assembled at the factory with the respective steam manifold 24 and steam condensate headers 27. While five (5) bundles are illustrated positioned in the transport container, more or less individual bundles may be shipped per container depending as needed or required.

Alternatively, the above described embodiments of the present employ tube bundles manufactured and assembled, prior to shipping, having steam manifold 24 and steam condensate headers 27, alternative embodiment bundles may not include a manifold prior to shipping. More specifically, in such embodiments, the tube bundles may be ship without steam manifolds 24 attached thereto. In said embodiments, the tube bundles 28 may be assembled in field to form the A-type configuration, as discussed above. However, instead of employing two steam manifolds, this alternative embodiment may employ a single steam manifold wherein the single steam manifold extends along the "apex" of the A configuration.

Figure 6:
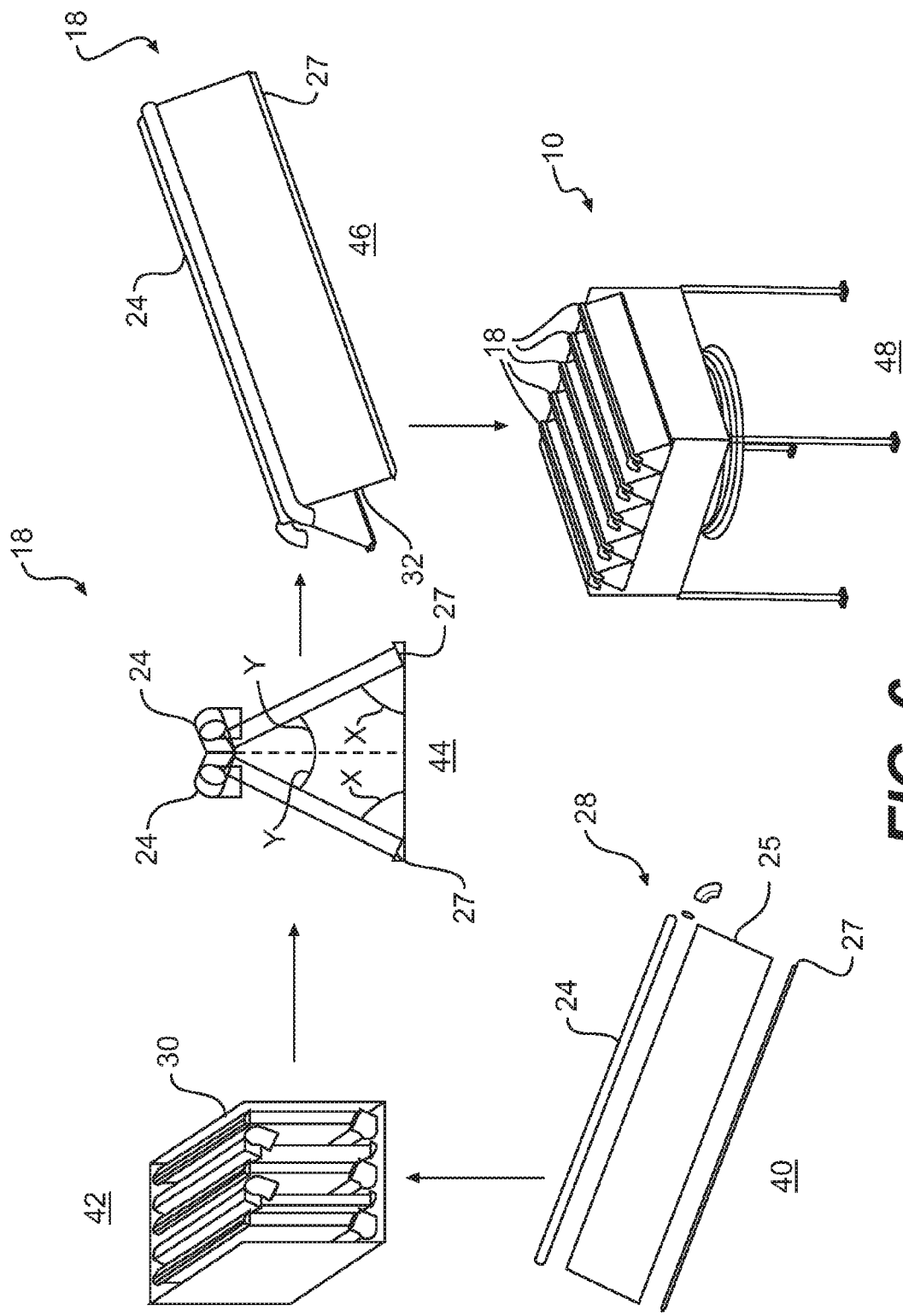
FIG. 6 schematically illustrates the steps of assembly of an air cooled condenser in accordance with an embodiment of the present invention.

Referring now to FIG. 6, a flow chart is illustrated, schematically depicting the steps of assembly of the air cooled condenser tower 10. As previously described, the individual tube bundles 28 are assembled prior to shipment to the job site, as referenced by numeral 40. Each individual bundle assembly 28 includes a plurality of finned tubes 25 along with a steam manifold 24 and steam condensate header 27. As previously discussed in connection with the previous figures of the specification, the bundle assemblies 28 are pre-manufactured at the factory prior to placing the individual bundle assemblies 28 in the shipping container 30 as identified by numeral 42. The shipping containers 30 are then shipped to the erection field site.

Next, the delta, generally indicated as 18, is assembled in the field as identified by numerals 44 and 46. As previously described, while the bundles may be positioned at any desired angle, they preferably are positioned at an angle (y) approximately twenty degrees(20°) to approximately thirty degrees(30°) from vertical and an angle (x) approximately sixty degrees(60°) to approximately seventy degrees(70°) from horizontal. More specifically, the bundles are positioned at twenty-six degrees)(26°) from vertical and sixty-four degrees(64°) from horizontal. As designated by numeral 46, a single A-type delta is illustrated 18 formed by two bundle assemblies 28 to form the "A" configuration. The bundle assemblies 28 self support one another in this configuration.

Turning now to the air cooled condenser module 10 as referenced by the numeral 48, it is depicted employing five deltas 18. As discussed above, the air cooled condenser is an improvement over current air cooled condenser types and it has a high "pre-fabrication" level which equates to reduced installation cost and reduced installation time. Moreover, the above-described design reduces the pressure drop, thereby providing a more efficient heat exchange apparatus.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, for example a forced draft air cooled condenser has been illustrated but an induced draft design can be adapted to gain the same benefits and, accordingly, all suitable modifications and equivalents may be resorted to that fall within the scope of the invention.

What is claimed:

1. A mechanical draft modular air cooled condenser comprising:
   a succession of a first condenser bundle panel, a second condenser bundle panel, a third condenser bundle panel, and a fourth condenser bundle panel;
   a first condenser pair including:
      the first condenser bundle panel having a first top end and a first bottom end;
      a first condensate header connected to the first bottom end, the first condenser bundle panel including a first set of parallel tubes connected perpendicularly to the first condensate header;
      the second condenser bundle panel consecutive to the first condenser bundle panel, the second condenser bundle panel having a second top end and a second bottom end; and
      a second condensate header connected to the second bottom end, the second condenser bundle panel including a second set of parallel tubes connected perpendicularly to the second condensate header, the first bottom end of the first condenser bundle panel and the second bottom end of the second condenser bundle panel converging toward each other, the first condensate header and the second condensate header separated by a first distance, the first condensate header parallel to the second condensate header;
   a second condenser pair including:
      the third condenser bundle panel consecutive to the second condenser bundle panel, the third condenser bundle panel having a third top end and a third bottom end;
      a third condensate header connected to the third bottom end, the third condenser bundle panel including a third set of parallel tubes connected perpendicularly to the third condensate header, the third condensate header and the first condensate header separated by a second distance, the second distance greater than the first distance, the third condensate header parallel to second condensate header;
      the fourth condenser bundle panel consecutive to the third condenser bundle panel, the fourth condenser bundle panel having a fourth top end and a fourth bottom end; and
      a fourth condensate header connected to the fourth bottom end, the fourth condenser bundle panel including a fourth set of parallel tubes connected perpendicularly to the fourth condensate header, the third bottom end of the third condenser bundle panel and the fourth bottom end of the fourth condenser bundle panel converging toward each other, the fourth condensate header and the third condensate header separated by the first distance, the fourth condensate header and the second condensate header separated by the second distance, the fourth condensate header parallel to third condensate header;
   a fan positioned to create a draft to flow over the first condenser bundle panel, over the second condenser bundle panel, over the third condenser bundle panel, and over the fourth condenser bundle panel; and
   a support frame that supports the first, second, third, and fourth condenser bundle panels.

2. The modular air cooled condenser according to claim 1, wherein the second top end of the second condenser bundle panel and the third top end of the third condenser bundle panel converge toward each other.

3. The modular air cooled condenser according to claim 1, further including a shroud surrounding the fan.

4. The modular air cooled condenser according to claim 1, wherein individual tubes of the first, the second, the third, and the fourth sets of parallel tubes have a length equal to approximately two meters.

5. The modular air cooled condenser according to claim 1, wherein the first, the second, the third, and the fourth condenser bundle panels each have a length greater than ten meters.

6. The modular air cooled condenser according to claim 1, wherein the second condensate header and the third condensate header are disposed between the first condensate header and the fourth condensate header.

7. The modular air cooled condenser according to claim 1, wherein the first condenser bundle panel and the second condenser bundle panel form a V-shape.

8. The modular air cooled condenser according to claim 1, wherein the second condenser bundle panel and the third condenser bundle panel form an inverted V-shape.

9. A frame comprising:
   a first condenser bundle panel including a first set of parallel tubes connected perpendicularly to a first condensate header, the first condenser bundle panel removable from the frame;
   a second condenser bundle panel including a second set of parallel tubes connected perpendicularly to a second condensate header, the second condenser bundle panel removable from the frame;
   a third condenser bundle panel including a third set of parallel tubes connected perpendicularly to a third condensate header, the third condenser bundle panel removable from the frame; and
   a fourth condenser bundle panel including a fourth set of parallel tubes connected perpendicularly to a fourth condensate header, the fourth condenser bundle panel removable from the frame.

10. The frame of claim 9, wherein the first condenser bundle panel is at least ten meters in length and respective tubes of the first set of parallel tubes have a length of approximately two meters.

11. The frame of claim 9, wherein the first condenser bundle panel, the second condenser bundle panel, the third condenser bundle panel, and the fourth condenser bundle panel are arranged substantially parallel to each other, and the frame is dimensioned for removable placement in a shipping container for transportation.

* * * * *